United States Patent [19]

Dryer

[11] 4,160,342
[45] Jul. 10, 1979

[54] POTS FOR GROWING PLANTS

[75] Inventor: Grant M. Dryer, Houston, Tex.

[73] Assignee: Canaird Sales Ltd., Scarborough, Canada

[21] Appl. No.: 812,344

[22] Filed: Jul. 1, 1977

[51] Int. Cl.² .............................................. A01G 9/02
[52] U.S. Cl. ......................................................... 47/80
[58] Field of Search ........................................ 47/79–82

[56] References Cited

U.S. PATENT DOCUMENTS

| | | | |
|---|---|---|---|
| 2,223,360 | 12/1940 | Ellis | 47/79 |
| 2,344,202 | 3/1944 | Carlson | 47/80 |
| 2,695,474 | 11/1954 | Barstow | 47/81 |
| 2,865,137 | 12/1958 | Longacre | 47/80 |
| 3,534,498 | 10/1970 | Herrli | 47/81 |
| 3,962,824 | 6/1976 | Poston | 47/81 |

FOREIGN PATENT DOCUMENTS

| | | | |
|---|---|---|---|
| 95471 | 1/1971 | France | 47/80 |
| 1316159 | 5/1973 | United Kingdom | 47/80 |

Primary Examiner—Robert E. Bagwill
Attorney, Agent, or Firm—Carl B. Fox, Jr.

[57] ABSTRACT

Pots for growing plants, wherein an outer pot has an upwardly facing interior annular shoulder therearound which is disposed below a downwardly facing exterior annular shoulder of an inner pot fitted within the outer pot. The inner pot has an inwardly projecting vertical sidewall formation which provides a channel through which water may be introduced into the bottom of the outer pot. The bottom of the inner pot is spaced above the bottom of the outer pot, and the inner pot has a downwardly extending well at its center which is spaced closely above the bottom of the outer pot, and which extends below the surface of the water in the bottom of the outer pot. The bottom of the inner pot has holes therethrough through which excess water in soil in the inner pot drains into the outer pot. The bottom of the well has holes through which water rises into the well, which is filled with a material such as perlite which causes water to rise into the soil in the inner pot by adsorption.

10 Claims, 4 Drawing Figures

POTS FOR GROWING PLANTS

BACKGROUND OF THE INVENTION

Proper watering of pot plants is a difficult problem. Too much water causes rotting of the plant roots. Too little water causes improper root development. It is recommended that the soil of pot plants be allowed to almost dry out before additional water is added, but this advise although good is not easy to follow because it is difficult to tell just how wet the soil is in the bottom of the pot. Many so-called self-watering pots have been made, but these are not entirely dependable and satisfactory since with many excessive amounts of water may be lost by evaporation resulting in underwatering of the plant, and with others excessive soil wetting may occur to cause rotting of the plant roots. There are some of the problems which the present invention seeks to solve.

SUMMARY OF THE INVENTION

The invention provides pots for pot plants through the use of which most pot plants will need to be watered only once per month. For certain plants, other watering schedules may need to be followed. With a definite watering schedule, watering can be done on a regular basis, without knowledge of the condition of wetness of the soil in the pot at the time of watering, so that proper watering of plants can always be achieved. An inner pot is fitted within an outer pot, the inner pot having a downwardly extending well which extends into water in the lower part of the outer pot. Holes at the bottom of the well permit water to rise into the well, the well being filled with a particulate material such as perlite which by adsorption will cause water to rise into the soil above the well. Water adsorption by the soil itself causes the body of soil in the pot to become wetted throughout, only damp in the upper portions of the pot and somewhat wetter toward the bottom of the pot. The bottom of the inner pot at the upper level of the well has drain holes therethrough through which any excess water in the soil may drip down into the lower pot, so that the soil will never become excessively wetted.

Pots of the type shown in U.S. Pat. No. 3,552,058 to Fici suffer the drawback that the interior structure cannot be removed from the outer pot without uprooting of the plant. Additionally, the vent holes adjacent the water level in the bottom of the pot permit excessive water evaporation. The structures shown in U.S. Pat. Nos. 1,213,331, 3,271,900, 32,912, 681,672, 248,213, 3,758,987, British Pat. No. 1,096,014, Swiss Pat. No. 466,630, French Pat. No. 2,067,474, and in *The Nature and Properties of Soils*, Buckman and Brady, Macmillan Company, 7th Ed., 1969, pp. 178-185, and in U.S. Pat. No. 2,344,202, possess similar and additional deficiencies.

A principal object of the invention is to provide pots for growing plants which may be satisfactorily watered on a regular basis without the growing plant becoming either over-watered or under-watered at any time. Another object of the invention is to provide such pots wherein the water supply container and the soil container may be separated without the necessity for uprooting of the plant or for risking uprooting of the plant. A further object of the invention is to provide such pots wherein watering of the plant is accomplished without overwetting any portion of the soil in the pot. Other objects of the invention are to provide such pots which are simple, economical, and attractive.

Other objects and advantages of the invention will appear from the following detailed description of a preferred embodiment thereof, reference being made to the accompanying drawings.

BRIEF DESCRIPTIONS OF THE DRAWINGS

DETAILED DESCRIPTION OF THE PREFERRED EMBODIMENT

Figure 1:
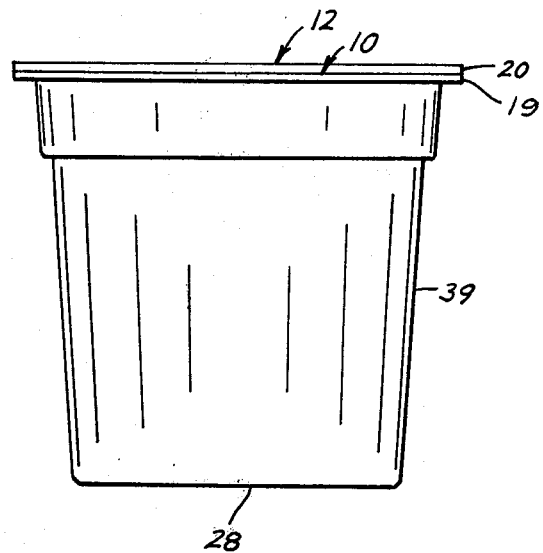
FIG. 1 is a side elevation of a preferred embodiment of apparatus according to the invention.
Figure 2:
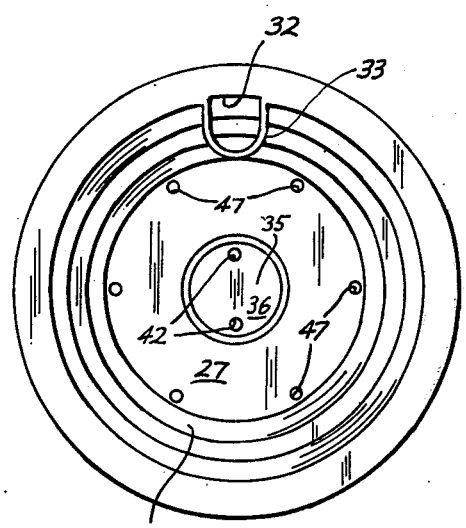
FIG. 2 is a top view of the apparatus shown in FIG. 1.
Figure 3:
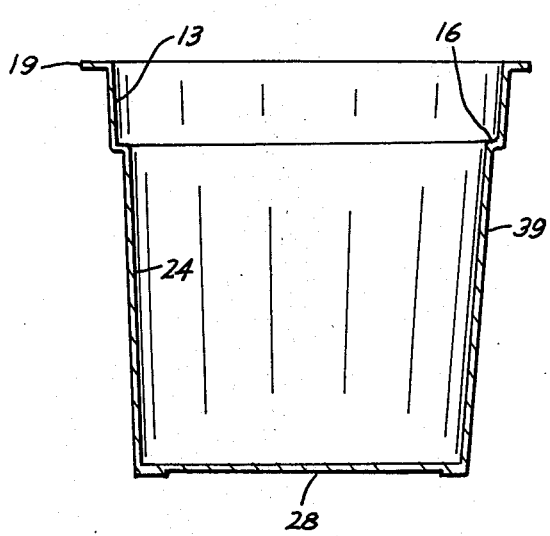
FIG. 3 is a vertical cross section of the outer pot portion of the apparatus shown in FIG. 1.
Figure 4:
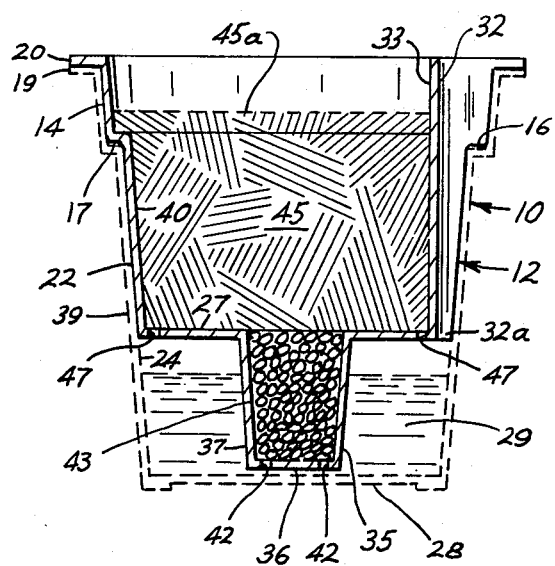
FIG. 4 is a vertical cross section of the inner pot portion of the apparatus shown in FIG. 1, the position of the outer pot portion being shown in dashed-line outline form.

Referring to the drawings in detail, the pot apparatus in preferred embodiment as shown in the drawings includes an outer opt structure 10 and an inner pot structure 12, hereinafter referred to simply as the outer pot 10 and the inner pot 12, respectively. At its upper end, outer pot 10 has a slightly tapered interior surface 13 adapted to sealingly engage the similarly tapered exterior surface 14 of inner pot 12. Upwardly facing shoulder 16 of outer pot 10 is spaced slightly below downwardly facing shoulder 17 of inner pot 12, and the inner pot 12 is supported at the contact between the outer and inner pots 10 and 12 at the surfaces 13, 14. Outwardly projecting annular flange 19 around the upper end of outer pot 10 does not forcefully engage projecting annular flange 20 around the upper end of inner pot 12 unless surfaces 13, 14 are wedged tightly together forming a seal therebetween. Lower exterior taper 22 of the inner pot similarly engages lower interior taper 24 of the outer pot.

Bottom 27 of the inner pot 12 is spaced above the bottom 28 of the outer pot 10, forming a water reservoir therebetween which is referred to by reference numeral 20. Water is introduced to reservoir space 29 through passage 32 formed by inwardly humped vertical formation 33 of the wall of inner pot 12. Passage 32 is of larger cross section at its upper end than at its lower end, as shown, and terminates downwardly at the level of bottom 27 of the inner pot.

The inner pot 12 has a well formation 35 of circular cross sections positioned concentrically of the pot. Well 35 extends downwardly so that its bottom 36 is closely spaced from bottom 28 of outer pot 10, this spacing preferably being relatively small, say from 1/16th inch to ⅛th inch. A larger spacing can be used. Sidewall 37 of well 35 may be tapered, as shown, or may be vertical.

The sidewall of outer pot 10 is indicated by reference numeral 39, while the sidewall of inner pot 12 is indicated by reference numeral 40. The tapers and shoulder formations of these walls have already been described. Preferably, the walls are of uniform thicknesses, as shown. The outer and inner pots are preferably molded of plastic, polyethylene plastics being preferred, although they may be formed of any suitable material. Somewhat resilient materials are preferred, but non-resilient materials such as metals may be used.

The well 35 of the inner pot 12 is filled with a particulate material, such as for example, perlite, which will adsorb water on its surfaces and thereby draw water from reservoir 29 upwardly into inner pot 12. Bottom 36 of well 35 has holes 42 therethrough (two being shown) through which water enters the well. The perlite or other suitable particulate material is indicated by reference numeral 43.

Water is introduced through passage 32 into the bottom reservoir 29 of outer pot 10, preferably at regular intervals, say, for example, once per month. The water, adsorbed by perlite bed 43, wets all of the perlite and is carried upwardly to wet the lower part of the mass of soil 45 within the inner pot. The moisture passes upwardly through the soil 45, with the result that the entire mass of soil becomes dampened or wetted. The soil mass will be damp toward the top of the mass and wetted more and more toward the bottom of the mass. The top of the soil will not be completely dry as long as water capable of entering the bottom of the well remains in reservoir 29. The soil will not become excessively wetted, since any excess water will drain back to reservoir 29 through holes 47 provided around the edge of bottom 27 of inner pot 12. Excessive wetting of the soil is not likely to occur because of water drawn upwardly by the perlite in well 35, but in the event of water being poured directly into the soil or of rain falling directly into the soil, excess water could be disposed in the soil.

The inner pot 12 can be removed from the outer pot 10 without disturbing the plant or plants planted in the soil within the inner pot. This removal can be done once in a while if it is desired to clean out any dirt fines which might have accumulated at the bottom of reservoir 29, or to completely replace the water in reservoir 29, or to get rid of excess water resulting from inadvertent pouring of water directly into the soil or from a heavy rainfall. In the latter event, the inner pot may be left out of the outer pot for a sufficient time for the excess water to drain out of the soil, after which the inner pot may be replace within the outer pot and watering resumed in the proper manner.

Evaporation of water from reservoir 29 does not occur to any considerable extent, since the lower end of passage 32 at 32a is of relatively small size, and there is no cross ventilation through any other opening. Evaporation of water does occur from the upper soil surface 45a, and additional water is drawn upwardly from reservoir 29 to replace the water thus lost from the soil.

Fertilizer, or another soil treating or conditioning agent, may be dissolved in the water placed in reservoir 29, and will be drawn upwardly into the soil. In this manner, the plant or plants in the pot may be fertilized or treated on a continuous basis.

Watering of the bottom soil layer may be enhanced by placement of a shallow layer of coarse sand or fine gravel across the upper surface of bottom 27 around well 35. This causes spread of water from the perlite across the entire bottom of the soil, so that water may spread upwardly through the soil over the full horizontal area of the pot. If this layer is omitted, water will nonetheless spread throughout the soil, but at a somewhat slower rate initially. The sand or gravel layer also to some extent prevents soil fines from being carried down into the reservoir in case of drainage due to overwatering at the soil surface.

While a preferred embodiment of apparatus has been described and shown in the drawings, many modifications thereof may be made by a person skilled in the art without departing from the spirit of the invention, and it is intended to protect by Letters Patent all forms of the invention falling within the scope of the following claims.

I claim:

1. Pot apparatus for growing plants, comprising an outer pot structure having a surrounding upstanding side wall and a horizontally disposed bottom, an inner pot structure having a surrounding upstanding side wall and a horizontally disposed bottom including a central well portion extending downwardly from its center having a surrounding side wall and a horizontally disposed bottom, said inner pot structure being removably disposed within said outer pot structure and including means around its upper end releasably sealedly engaged with said outer pot structure, the upper ends of said outer and inner pot structures terminating upwardly at substantially the same level, said inner pot bottom being spaced well above said outer pot bottom and said well bottom being closely spaced above said outer pot bottom, opening means through said inner pot bottom and opening means through said well bottom, said side wall of said inner pot structure being offset inwardly at a circumferential portion thereof to form a vertical passage means between said outer and inner pot structures extending from said upper ends of said outer and inner pot structures downwardly to said inner pot bottom and providing an entrance for introducing water into the lower part of said outer pot structure around said well without removal of said inner pot structure, said well including means for causing water to rise upwardly through said well to wet soil placed in said inner pot structure above said well, any excess water in the soil above said bottom of said inner pot structure draining through said opening means through said inner pot bottom to be returned to said lower part of said outer pot structure around said well.

2. The combination of claim 1, said means for causing water to rise comprising subdivided surface active material disposed in said well.

3. The combination of claim 1, said subdivided surface active material comprising perlite.

4. The combination of claim 1, said means around the upper end of said inner pot structure sealedly engaged with said outer pot structure comprising said side wall of said inner pot structure closely engaged with the side wall of said outer pot structure.

5. The combination of claim 4, including horizontally outwardly projecting flange means around said upper ends of said outer and inner pot structures, said inner pot structure flange being engaged with said outer pot structure flange.

6. The combination of claim 5, the upper portions of the side walls of said outer and inner pot structures being separated from the lower portions of said side walls by generally horizontal shoulders, said upper portions of the side walls being of greater diameters than said lower portions of the side walls.

7. The combination of claim 6, said means for causing water to rise comprising subdivided surface active material disposed in said well.

8. The combination of claim 7, said subdivided surface active material comprising perlite.

9. The combination of claim 8, said well bottom being spaced above said outer pot bottom by a spacing no greater than about one-eighth inch.

10. Self-watering pot apparatus for growing plants, comprising an imperforate outer pot, an inner pot disposed in said outer pot, said outer and inner pots having upper ends at substantially the same level and being sealingly engaged around their upper ends, said inner pot having a side wall which is inwardly displaced over a vertical portion thereof to form a passage means between said outer and inner pots extending from their said upper ends to the bottom of said inner pot, the size of said passage means being reduced to small size toward its lower end to limit water evaporation from the bottom of said outer pot therethrough, a well extending downwardly from said inner pot bottom to closely adjacent the bottom of said outer pot, openings through the bottom of said inner pot to permit drainage of water downwardly into said outer pot, openings through the bottom of said well to permit water to flow from the bottom of said outer pot into said well, and surface active material filling said well to cause water in said well to rise to above said bottom of said inner pot to wet soil disposed therein, said inner pot being removable from said outer pot without disturbing soil disposed in said inner pot and without disturbing the roots of a plant planted in said soil.

* * * * *